(12) United States Patent
Thomas et al.

(10) Patent No.: US 10,048,779 B2
(45) Date of Patent: Aug. 14, 2018

(54) VIRTUAL HAND BASED ON COMBINED DATA

(75) Inventors: Fred Thomas, Fort Collins, CO (US); Robert Adam Baum, Ft. Collins, CO (US); David H Hanes, Loveland, CO (US); John Michael Main, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 185 days.

(21) Appl. No.: 14/391,436

(22) PCT Filed: Jun. 30, 2012

(86) PCT No.: PCT/US2012/045148
§ 371 (c)(1),
(2), (4) Date: Oct. 9, 2014

(87) PCT Pub. No.: WO2014/003796
PCT Pub. Date: Jan. 3, 2014

(65) Prior Publication Data
US 2015/0084866 A1  Mar. 26, 2015

(51) Int. Cl.
*G06F 3/0354* (2013.01)
*G06F 3/0481* (2013.01)
(Continued)

(52) U.S. Cl.
CPC .......... *G06F 3/03547* (2013.01); *G06F 3/017* (2013.01); *G06F 3/0416* (2013.01);
(Continued)

(58) Field of Classification Search
CPC ........ G06F 3/041; G06F 3/01; G06F 3/03547; G06F 3/04817; G06F 3/04883;
(Continued)

(56) References Cited

U.S. PATENT DOCUMENTS 5,767,842 A * 6/1998 Korth ...................... G06F 3/011
345/168
6,433,774 B1 * 8/2002 D'Hooge .............. G06F 3/0426
345/157

(Continued)

FOREIGN PATENT DOCUMENTS

CN   101901051 A   12/2010
CN   102334086 A   1/2012
(Continued)

OTHER PUBLICATIONS

LEAP; "Say Goodbye to your mouse and keyboard"; May 20; 2012; 11 pages.
(Continued)

*Primary Examiner* — Mihir K Rayan
(74) *Attorney, Agent, or Firm* — HP, Inc. Patent Department (57) ABSTRACT

An example computing system may include a display and an input device. The input device may include a touch sensor to provide touch data, and a contactless sensor to provide contactless data. A field of view of the contactless sensor is directed away from the touch sensor. A controller is to combine the touch data and the contactless data into combined data to generate a virtual hand to be displayed on the display. The virtual hand is to include an unsensed feature.

20 Claims, 6 Drawing Sheets

(51) Int. Cl.
*G06F 3/0488* (2013.01)
*G06F 3/01* (2006.01)
*G06F 3/041* (2006.01)

(52) U.S. Cl.
CPC ...... *G06F 3/04817* (2013.01); *G06F 3/04883* (2013.01); *G06F 2203/0381* (2013.01); *G06F 2203/04101* (2013.01)

(58) Field of Classification Search
CPC .................. G06F 3/017; G06F 3/0416; G06F 2203/04101; G06F 2203/0381
See application file for complete search history.

(56) References Cited

U.S. PATENT DOCUMENTS

| | | | | |
|---|---|---|---|---|
| 7,042,442 | B1* | 5/2006 | Kanevsky | G06F 3/017 345/157 |
| 7,088,343 | B2 | 8/2006 | Smith et al. | |
| 7,810,050 | B2* | 10/2010 | Hirai | G06F 3/0425 345/173 |
| 7,969,409 | B2 | 6/2011 | Krepec | |
| 8,018,579 | B1* | 9/2011 | Krah | G01B 11/00 356/4.01 |
| 8,140,970 | B2* | 3/2012 | Brown | G09B 13/04 345/168 |
| 8,194,036 | B1 | 6/2012 | Braun et al. | |
| 8,228,345 | B2* | 7/2012 | Brown | G06F 3/04895 345/1.1 |
| 8,390,821 | B2* | 3/2013 | Shpunt | G01B 11/25 356/512 |
| 8,760,391 | B2* | 6/2014 | Hawkins | G06F 3/017 178/18.01 |
| 2003/0085870 | A1* | 5/2003 | Hinckley | G06F 1/1626 345/156 |
| 2008/0158172 | A1* | 7/2008 | Hotelling | G06F 1/3231 345/173 |
| 2009/0146957 | A1* | 6/2009 | Lee | G06F 3/04886 345/168 |
| 2010/0053151 | A1* | 3/2010 | Marti | G06F 3/011 345/419 |
| 2010/0231522 | A1 | 9/2010 | Li | |
| 2010/0265316 | A1* | 10/2010 | Sali | H04N 13/0253 348/46 |
| 2011/0006991 | A1* | 1/2011 | Elias | G06F 1/1662 345/168 |
| 2011/0043702 | A1* | 2/2011 | Hawkins | G06F 3/011 348/584 |
| 2011/0279397 | A1* | 11/2011 | Rimon | G06F 3/044 345/173 |
| 2012/0062558 | A1* | 3/2012 | Lee | G06F 3/017 345/419 |
| 2012/0117514 | A1* | 5/2012 | Kim | G06F 3/011 715/849 |
| 2012/0169671 | A1* | 7/2012 | Yasutake | G06F 3/0425 345/175 |
| 2013/0265219 | A1* | 10/2013 | Sato | G06F 3/01 345/156 |

FOREIGN PATENT DOCUMENTS

| | | |
|---|---|---|
| TW | 200816023 A | 4/2008 |
| TW | 201104529 A | 2/2011 |

OTHER PUBLICATIONS

Malik, S. et al., Visual Touchpad: a Two-handed Gestural Input Device, (Research Paper), Proceedings of the 6th international conference on Multimodal interfaces. Oct. 13-15, 2004, pp. 289-296.

PCT; "Notification of Transmittal of the International Search Report and the Written Opinion of the International Searching Authority, or the Declaration"; cited in PT/US2012/045148; dated Feb. 22, 2013; 9 pages.

\* cited by examiner

VIRTUAL HAND BASED ON COMBINED DATA

BACKGROUND

Touch technology has been used for display interaction with mobile devices such as smart phones and tablets. Touch technology may be used to support personal computer (PC) touch experiences for larger screens, e.g., desktop computers. However, as display format sizes increase, the cost for full-display touch technology may increase exponentially, and may result in "gorilla arm" (the human arm held in an unsupported horizontal position rapidly becomes fatigued and painful) when using a large-size touch screen. A separate trackpad may be used as an indirect touch device that connects to the host computer to act as a mouse pointer when a single finger is used. The trackpad can be used with gestures, including scrolling, swipe, pinch, zoom, and rotate. However, the separate trackpad/display may not provide the type of interactive experience that is provided by a touchscreen, due to the disconnection between how the trackpad is used to interact with the display.

DETAILED DESCRIPTION

Example systems may provide a direct touch experience, even in large screen touch environments (e.g., personal computers (PCs) and tablets). A lower-cost trackpad or trackpad variation may be used to provide the direct touch experience, providing savings compared to using a larger format flush touch display such as a full-screen projective capacitive touch (PCT) display. The trackpad may avoid the distressful condition called "gorilla arm," while allowing for an immersive touch experience.

An example computing system may include a display and an input device. The input device may include a touch sensor to provide touch data, and a contactless sensor to provide contactless data. A field of view of the contactless sensor is directed away from the touch sensor. A controller is to combine the touch data and the contactless data into combined data to generate a virtual hand to be displayed on the display. The virtual hand is to include an unsensed feature.

Example systems may enable a transposed direct touch experience, through use of a touch trackpad. The trackpad can provide a low-cost mechanism to enable a flush-touch PC display interaction experience. A translucent virtual hand may be rendered and superimposed on the display, e.g., using software and/or a controller. A compelling flush-touch interaction with a full-sized display may be experienced, as though an expensive PCT-based touch display were being used. A contactless sensor (e.g., a periscopic camera) may be used with the touchpad to provide additional (e.g., three dimensional (3D) perspective) information to enable a transparent virtual hand to be generated/rendered on the display.

Figure 1:
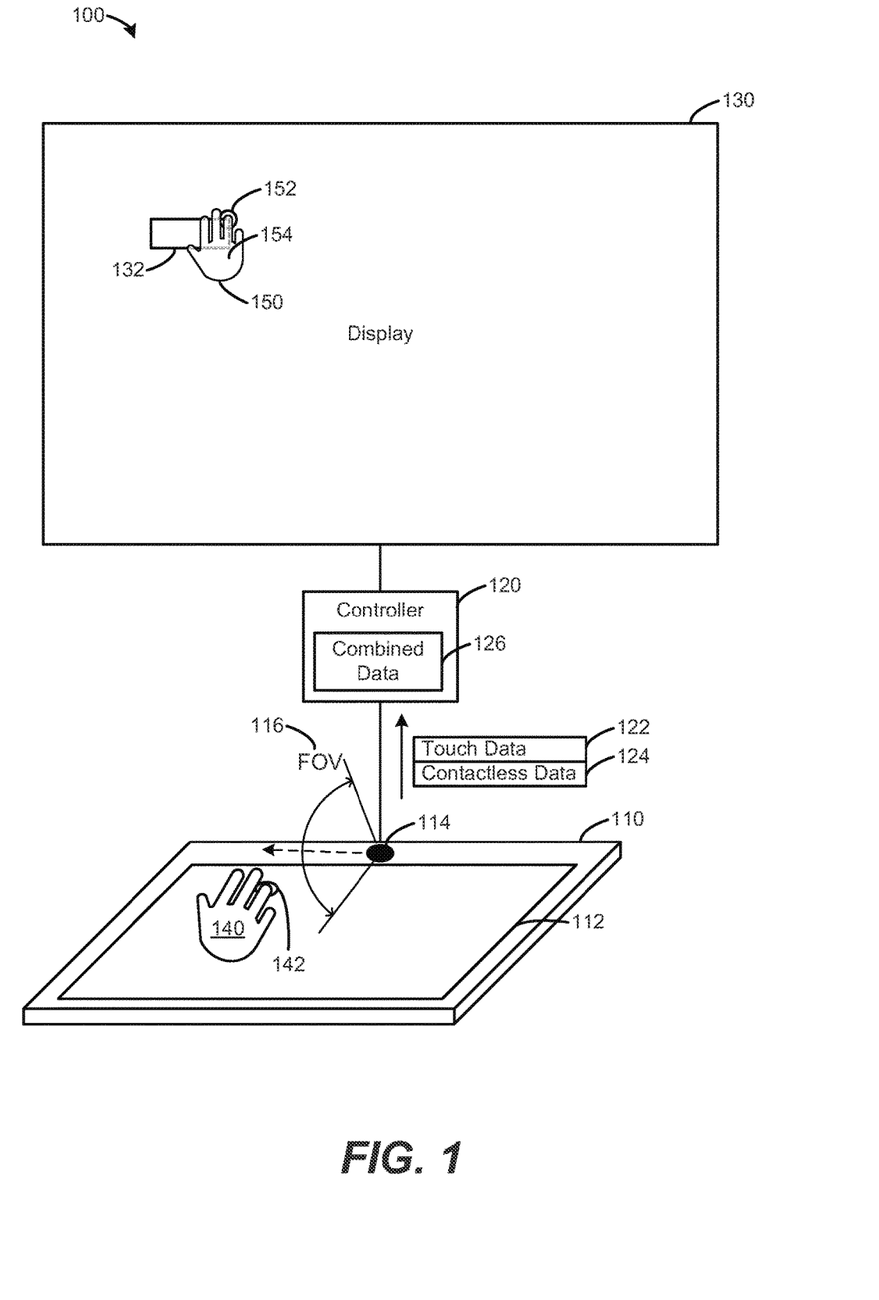
FIG. 1 is a block diagram of a computing system including an input device according to an example.

FIG. 1 is a block diagram of a computing system 100 including an input device 110 according to an example. The computing system 100 also may include a controller 120 and a display 130. The input device 110 may include a touch sensor 112 and a contactless sensor 114. The input device 110 may generate touch data 122 (e.g., based on the touch sensor 112) and contactless data 124 (e.g., based on the contactless sensor 114). The controller 120 may provide combined data 126 based on the touch data 122 and the contactless data 124.

The controller 120, based on the combined data 126, may cause a virtual hand 150 to be displayed on the display 130. The virtual hand 150 may include an unsensed feature 154 (e.g., a back-side of the virtual hand 154, fingernails, spaces between fingers, knuckles, skin, wrinkles, hair, and so on). The virtual hand 150 may be translucently overlaid on a displayed element 132, such that the underlying displayed element 132 is visible through the virtual hand 150. The virtual hand 150 may indicate a virtual touch 152, corresponding to a sensed touch 142 of the sensed hand 140.

Contactless sensor 114 may be associated with a field of view (FOV) 116. The FOV 116 is directed away from the touch sensor 112 of the input device 110, as indicated by the dashed arrow. In other words, the contactless sensor 114 is looking upward from (or sideways across) the input device 110, in contrast to looking downward from an overhead perspective relative to the input device 110. The FOV 116 is shown as less than 180 degrees, but may be larger or smaller, including fully spherical FOVs that may be based on one contactless sensor 114 and/or multiple contactless sensors 114. Thus, the FOV 116 may sense the sensed hand 140 from a non-overhead perspective, e.g., from underneath (viewing a palm of the sensed hand 140) or from a side of the sensed hand 140.

The FOV 116 may be based on a focal length and sensor size of the contactless sensor 114. Thus, FOV 116 may differ based on various properties of a particular sensor, including other features such as optics used with a particular sensor. In an example, contactless sensor 114 may include a lens and corresponding sensor to provide a 160 degree FOV, but an interaction space is chosen that may use a narrower FOV 116 less than 160 degrees.

Various elements described in connection with the examples disclosed herein may be implemented as electronic hardware, computer software, or combinations of both. For example, the controller 120 may be implemented using software modules, hardware modules or components, or a combination of software and hardware modules or components. In another example, at least one of the elements may comprise software code stored on a non-transitory computer readable storage medium, which is executable by a processor and/or memory. The controller 120 may be any combination of hardware and software that executes or interprets instructions, data transactions, codes, or signals. For example, the controller 120 may be a microprocessor, an Application-Specific Integrated Circuit ("ASIC"), a distributed processor such as a cluster or network of processors or computing devices, or a virtual machine. The controller 120 is shown separate from the display 130 and input device 110, although in alternate examples various elements may be integrated (e.g., integrating the controller 120 and/or display 130 into the input device 110).

The combined data 126 may be used to identify various features of the sensed hand 140. The combined data 126 may enable sensor fusion, wherein the touch data 122 is combined with the contactless data 124 to provide increased levels of information and accuracy. For example, controller 120 can identify that a ring finger of the sensed hand 140 is providing the sensed touch 142, based on touch data 122 indicating a single point of contact with the touch sensor 112, and contactless data 124 indicating a position of the sensed hand 140 relative to the sensed touch 142 and/or the input device 110. Accordingly, the virtual hand 150 may be displayed showing a virtual ring finger providing the virtual touch 152, with the virtual hand 150 mirroring the orientation of the sensed hand 140. A plurality of sensed touches may be detected and matched up with the contactless data to provide a realistic virtualization of the sensed hand 140, including 10-finger touch support using two sensed hands 140. An image of the virtual hand 150 may be rendered on the display 130, using the actual output of the touch sensor 112, including touch data 122 indicating where all fingers are laying. Accurate positioning of the virtual hand 150 may be provided on the display 130, along with relative location of virtual fingers on the display 130 compared to what the combined data 126 indicates regarding the sensed hand 140. Such sensor fusion may provide enhanced interaction and tracking between the sensed hand 140 and the virtual hand 150, facilitating the transposed direct touch experience.

The virtual hand 150 may realistically mimic, on the display 130, the orientation and motion of the sensed hand 140. The virtual hand 150 may be displayed while the sensed hand 140 is in contact with the touch sensor 112, and also may be displayed while the sensed hand 140 is hovering above the touch sensor 112, based on the combined data 126 according to sensor fusion and other augmentation of sensor data. The virtual hand 150 may be virtually generated, and not merely a captured/transposed/replayed image/video of the sensed hand 140.

By touching the touch sensor 112, high resolution touch data 122 is generated regarding where the fingers of the sensed hand 140 are positioned. Thus, the high resolution information may be given more weight compared to other sensor data, depending on relative resolution of the various sensors. The contactless sensor 114 may capture additional information, to augment the high resolution touch data 122, regarding the fingers, such as whether the fingers are curved or at specific orientations/angles and so on. The contactless sensor 114 may detect 3D/depth information (among other contactless data 124). For example, the contactless sensor 114 may be a 3D sensor or array of sensors to triangulate and/or interpret depth information. The depth information may be used to augment/increase accuracy regarding orientation and/or position of fingers, knuckles, and other features of the sensed hand 140, to generate/reconstruct the corresponding virtual hand 150.

Data generated by the input device 110 may be weighted. For example, the touch data 122 may be given a higher weight than the contactless data 124, when used to provide combined data 126. The relative weighting may be correlated with a degree of accuracy and/or precision associated with a sensor. In an example, the touch sensor 112 may be capable of providing data to a high degree of precision and accuracy, compared to a relatively lower degree of precision and accuracy associated with the contactless sensor 114. Accordingly, touch data 122 may be given more weight than the contactless data 124. Weighting the data may enable the controller 120 to prioritize the touch data 122 over the contactless data 124. In an example, if the touch data 122 indicates one position, and the contactless data 124 indicates a slightly different corresponding position, the controller 120 may use the touch data 122 to override the contactless data 124. In alternate examples, the contactless data 124 may be given a higher weight than the touch data 122 (e.g., a high resolution contactless sensor 114 sensing the sensed hand 140 at close range, or a situation where the sensed touch 142 is very light or intermittent). In an example, the data generated by the input device 110 may be monitored for abnormalities (e.g., sporadic readings of the touch data 122 from the touch sensor 112 caused by contamination/perspiration on the touch sensor 112), and the abnormalities may be compensated for by using other available data (e.g., using the contactless data 124). One form of data may be used to augment another form of data, and weighting may be used to inform how the controller 120 may determine which data to prioritize or give more weight. Data may be determined to be sporadic or otherwise questionable based on monitoring sensed data over time, for example, to identify deviations.

The combined data 126 may be generated using custom and/or off-the-shelf components, such as a universal serial bus (USB) webcam and touchpad components. The input device 110 is shown coupled to the controller 120 and display 130, and such coupling may be based on wires (e.g., USB cabling). Alternate examples may be implemented wirelessly using Wi-Fi direct, Bluetooth, WLAN (wireless local area network), or other wireless implementations.

The input device 110 and display 130 may be integrated as one computing device, e.g., provided on at least one surface of a mobile hand-held computing device. The various elements of computing system 100 do not need to be on the same surface of the device. Although the touch sensor 112 is illustrated in FIG. 1 as smaller in size than the display 130, sizes of the various elements may vary. For example, the touch sensor 112 may be the same size or a larger size than the display 130. Examples are not limited to the touch sensor 112 being smaller in size than the display 130.

The virtual hand 150 may be used to interact with displayed elements 132, such as user interface elements, documents, computer aided drafting (CAD) models, or other displayed elements 132. Gestures identified by the controller 120 may be used to initiate interaction sessions. FIG. 1 illustrates the virtual hand 150 interacting with displayed element 132 based on the virtual touch 152. As illustrated, the virtual hand 150 is holding the displayed element 132, enabling the displayed element 132 to be manipulated.

Interaction with displayed elements 132 may be based on gestures to achieve various tasks, such as resizing, gripping, moving, scrolling, swiping, pinching, zooming, rotating, and other interactions. The virtual hand 150 may interact with supported gesture controls of a computer operating system, such as touch implementation in the Windows 8® and other operating systems. Such gesture controls may enable multi-touch gestures and other features, based on a human interface device (HID) defined device driver included in the operating system, a purpose built custom driver provided with the computing system 100, an Application Programming Interface (API) and Software Development Kit (SDK), or other techniques for interacting with a computing system and/or operating system. Additionally, the virtual hand 150 may interact based on additional gestures such as 3D gestures or other interactions not specifically supported by a built-in gesture support of an operating system (e.g., grabbing an element in 3D space, dragging the element in 3D space, and rotating the device along all axes of freedom/movement).

A sensed touch 142 is shown in FIG. 1, wherein the sensed touch 142 is correlated with an underlying displayed element 132 such that the controller 120 determines that the sensed touch 142 corresponds to grabbing the displayed element 132 (e.g., a grab gesture). Accordingly, combined data 126 may be interpreted with regard to the virtual hand 150 in the context of a displayed position relative to displayed elements 132. For example, the controller 120 may determine that the displayed element 132 is a clickable button, such that the sensed touch 142 corresponds to a click gesture instead of a grabbing gesture. Thus, the controller 120 may enable context-aware gestures, based on combined data 126 and/or based on the virtual hand 150 and its virtual surroundings (e.g., displayed elements 132).

The controller 120 also may enable different modalities. The example of FIG. 1 illustrates a selection modality, wherein the virtual hand 150 is operated in a mode to select the displayed element 132. The sensed touch 142 may be identified by the controller 120 as a trigger to transition from the selection modality to a 3D interaction modality, for example. Such a transition may be based on a special gesture (e.g., a triple-tap), and may be based on context of earlier gestures and/or states of the displayed elements 132 and/or virtual hand 150. In an example, the controller 120 may enable a positioning modality to sense movement of the sensed hand 140 and finger positions etc. When the sensed hand 140 is lifted away from the input device 110 (e.g., breaking contact with the touch sensor 112, and/or moving a specified distance such as within or outside of an interaction space), the controller 120 may recognize a change of modality to a reposition phase/mode. Alternatively, the controller 120 may recognize such a gesture as transitioning to a 3D interaction modality, instead of the reposition modality. Based on a modality of the computing system 100, the controller 120 may selectively disregard information and/or maintain the virtual hand. For example, during a reposition modality/phase, the controller 120 may display a static image of the virtual hand 150 while the sensed hand 140 is repositioned. Thus, during repositioning, the controller 120 may stop tracking of orientation and/or position information between the sensed hand 140 and the virtual hand 150, until the repositioning modality ends (e.g., the user replaces the hand back onto, or within a distance to, and/or within the interaction space of the input device 110).

Figure 2:
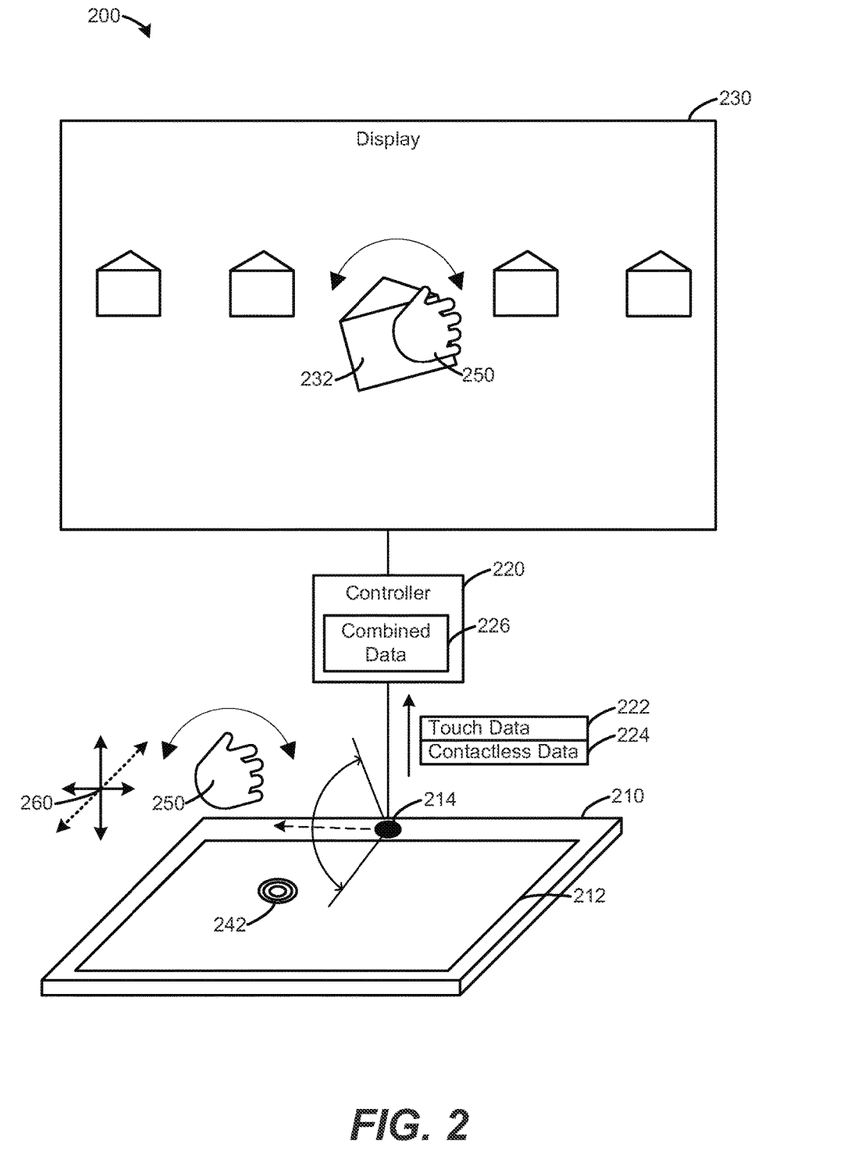
FIG. 2 is a block diagram of a computing system including an input device according to an example.

FIG. 2 is a block diagram of a computing system 200 including an input device 210 according to an example. The computing system 200 also may include a controller 220 and a display 230. The input device 210 may include a touch sensor 212 and a contactless sensor 214. The input device 210 may generate touch data 222 (e.g., based on the touch sensor 212) and contactless data 224 (e.g., based on the contactless sensor 214). The controller 220 may provide combined data 226 based on the touch data 222 and the contactless data 224.

The controller 220, based on the combined data 226, may cause a virtual hand 250 to be displayed on the display 230. The virtual hand 250 may interact with a displayed element 232, e.g., interact based on a gestural transition. An example gestural transition is shown as a triple-tap detected by three sensed touches 242 in rapid succession in close proximity to each other. The controller 220 may detect such a gestural transition to transition a modality/session/phase. For example, the controller 220 may transition from a touch modality to a 3D interaction modality. Accordingly, the controller 220 may monitor various movement/rotational gestures within 3D space 260, and translate them into interactions with the displayed element 232. The displayed element 232 is shown being grabbed and rotated in 3D space by the virtual hand 250, based on the contactless data 224 and the contextual understanding between the modality and the displayed element 232 relative to the virtual hand 250. By understanding various interaction modalities, the controller 220 is able to intelligently monitor the combined data 226 and apply it accordingly. For example, the controller 220 is able to disregard hand gyrations and other movements during a reposition phase, in contrast to tracking such gyrations/movements during a 3D interaction phase/modality. Although a triple-tap touch gesture is shown in FIG. 2 to transition to 3D interaction modality/phase, other gestures may be used, including touch-based, motion-based, sound-based, and other gestures.

Figure 3:
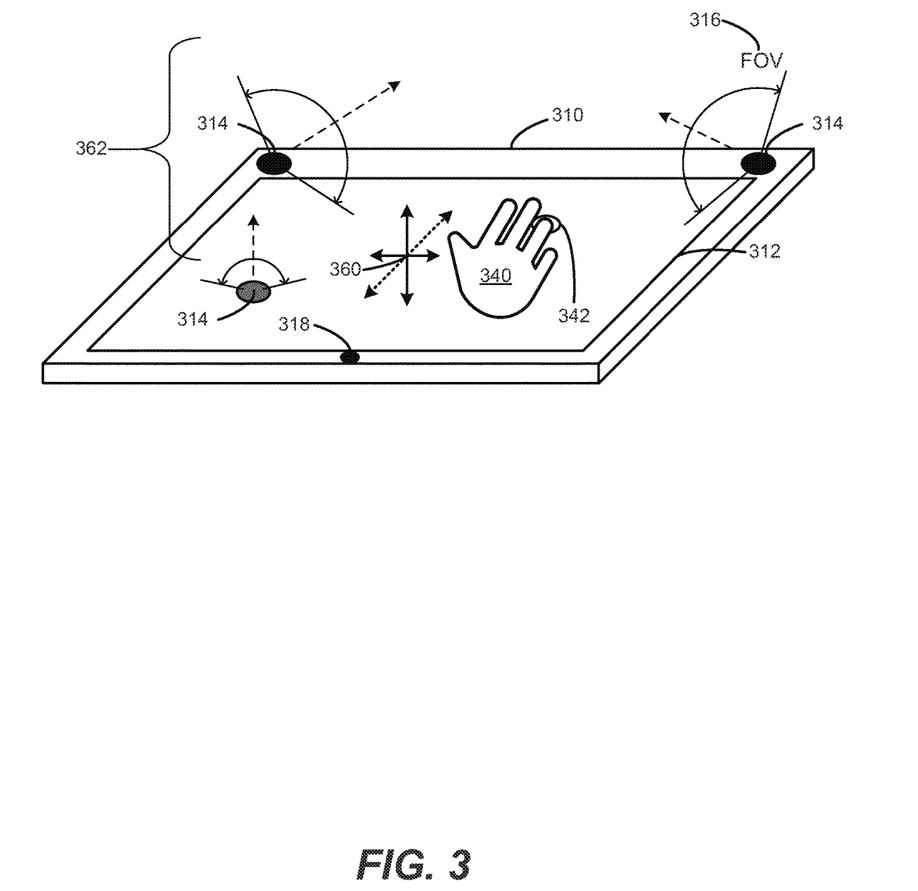
FIG. 3 is a block diagram of an input device according to an example.

FIG. 3 is a block diagram of an input device 310 according to an example. The input device 310 may include at least one touch sensor 312, sensor emitter 318, and/or contactless sensor 314. The contactless sensors 314 are associated with a field of view 316 directed away from the input device 310, as indicated by the dashed arrows. The input device 310 may provide an interaction space 362 to sense the sensed hand 340, including 3D positional information 360 and sensed touch 342. The interaction space 362 may be independent of the capabilities of the touch sensor 312 and/or contactless sensors 314. For example, the FOV 316 may provide contactless detection of a sensed hand 340 at a long range, but the interaction space 362 may be adjusted to be a comparatively shorter range. In an example, the interaction space 362 may be arbitrarily adjusted by the controller and/or other software-adjustable settings/preferences.

The illustrated example in FIG. 3 is shown having three contactless sensors 314, one touch sensor 312, and one sensor emitter 318. However, any number of elements may be used. For example, the touch sensor 312 may be provided as multiple individual touch sensors. In alternate examples, the illustrated positions of the elements also may vary.

The contactless sensor 314 may be a solid-state camera or other information enhancing sensor for observing gestures and anatomical positioning of the sensed hand 340 relative to the input device 310. The interaction space 362 may be provided based on combined data from at least one contactless sensor 314 and/or touch sensor 312. The interaction space 362 enables monitoring of the sensed hand 340 interacting flush to the touch sensor 312 and while the sensed hand 340 hovers above the touch sensor 312. For example, the interaction space 362 may extend a distance of approximately 6 inches above the input device 310. The interaction space 362 is not limited by the specific sensors, and may be chosen independently of specific hardware used.

Two contactless sensors 314 are shown at corners of the input device 310. Thus, the FOV 316 of the contactless sensors 314 may observe sides and a bottom (e.g., palm) of the sensed hand 340 (as it is positioned in FIG. 3; other aspects of the sensed hand 340 may be sensed, depending on the orientation of the sensed hand 340 relative to the input device 310). The contactless sensors 314 may be arranged to look at sides of the sensed hand 340, e.g., arranged along the edges and/or bottom of the input device 310. The contactless sensors 314 may collect information about the sensed hand 340 from a sensed perspective, wherein the sensed perspective differs from a displayed perspective of how a virtual hand is displayed on a display. The virtual hand may be generated to include data that is not observed by the contactless sensors 314 and/or the touch sensor 312, such as a back of a hand not within a line of sight associated with the FOV 316.

Examples may use more than two contactless sensors 314. Information from multiple contactless sensors 314 may be stitched together to form a composite image based on a composite field of view. For example, a composite field of view may span a greater viewpoint than a FOV 316 associated with a single contactless sensor 314.

Sensing the sensed hand 340 from a bottom and/or side of the sensed hand 340 may still provide data that enables a controller to generate a virtual hand from a top-down perspective. Furthermore, contactless sensors 314 may be low-profile with respect to the input device 310. There is no need to raise the contactless sensors 314 away from the touch sensor 312 in order to obtain a top-down perspective/viewpoint for the contactless sensors 314. For example, the contactless sensors 314 may be embedded within a surface of the input device 310, or provided in a hump. Therefore, a thin and sleek input device 310 may be provided, with a reduced vertical scale that avoids use of an elevated apparatus with contactless sensors 314 sticking out and facing downward toward the touch sensor 312. Integration of the contactless sensors 314 with the input device 310 enables a sleek, thin, low-profile and elegant unit without a kludgy or obtrusive apparatus sticking out for the contactless sensors 314.

The example of FIG. 3 includes a contactless sensor 314 within a perimeter of the touch sensor 312. Such a contactless sensor 314 may include a FOV directed away from and substantially perpendicular to a plane of the touch sensor 312. In other words, the contactless sensor 314 is primarily substantially directed outward from the touch sensor 312, although it is contemplated that a portion of a FOV of the contactless sensor 314 also may overlap with the touch sensor 312. In an example, the touch sensor 312 includes an aperture to accommodate the contactless sensor 314. A plurality of touch sensors 312 may be used to provide seams through which the contactless sensor 314 may receive sense data. In an alternate example, the touch sensor 312 includes a surface that may pass sensed data to the embedded contactless sensor 314. For example, the surface may be transparent to pass visual light data to the contactless sensor 314, including light in non-visible spectrums, as well as other data (e.g., aural) that may pass through the touch sensor 312.

Examples may use sensors that include an emitter and/or a receiver. For example, sensor emitter 318 may provide a signal to be reflected by the sensed hand 340 and picked up by a sensor receiver in a contactless sensor 314. The contactless sensor 314 itself may include at least one emitter and/or receiver provided as a contactless sensor 314. In an example, a near-infrared (IR) light emitting diode (LED) may be provided as an illumination emitter, and an appropriate optical IR receiver (e.g., a receiver including a cut-off filter to isolate IR wavelengths from other optical wavelengths) may be incorporated in the contactless sensor 314. Such an IR-based example may enable system functionality in any ambient lighting environment, by using its own signal source and/or filtering to block ambient light/noise and improve signal response.

A contactless sensor 314 (and/or sensor emitter 318) may use an emitter pattern to be emitted/directed toward the interaction space 362. In an example, the contactless sensor 314 and/or sensor emitter 318 may incorporate a mechanism for structuring the illumination as it is projected onto the sensed hand 340, e.g., using a hologram or other technique to structure the illumination. Structured illumination may provide enhanced 3D information regarding physical orientation and position of the sensed hand 340. Projected patterns may include dot matrix, multi-line, and other patterns. Patterns may be generated based on a laser, e.g., a solid-state laser, and a hologram to emit and pattern the light.

Contactless sensor 314 may include 3D camera sensing technologies such as PMD[Vision]® being developed by vendors such as PMD Technologies®. The contactless sensor 314 may be active and/or passive. Active contactless sensors 314 may include sensors based on time-of-flight, triangulation, conoscopic holography, hand-held laser scanner, structured light, modulated light, volumetric technologies, and other active sensing techniques. Passive contactless sensors 314 may include sensors based on stereoscopic, photometric, silhouette, photogrammetry technologies, and other passive sensing techniques. A contactless sensor 314 may include a lens or other optics to enhance or alter sensed data received at the sensor 314. Contactless sensors do not need to be in contact with a surface from which a parameter is being measured. Contactless sensors 314 may include sensors to detect aspects of a sensed hand 340 such as a metal ring, gloves, nail polish, or other features not inherent to a human hand (e.g., a pointer, stylus, avatar, barcode, radio frequency identification (RFID), Quick Response (QR) Code, and so on). Contactless sensors 314 may detect various forms of data, such as finger prints, perspiration, temperatures, pressures, positions, velocities, accelerations, torques, angles, distances, depths, chemicals, forces, moments, magnetic fields, electrical fields (including capacitance), ultrasonic measurements, strains, and so on. Thus, a variety of contactless sensors 314 may be used, corresponding to the various forms of data to be collected as part of the combined data for the controller.

The input device 310 may include a display integrated with the touch sensor 312, such that the input device 310 may be provided as a tablet or smartphone form-factor. Such an input device 310 may provide sensed data to generate a virtual hand on an external display, such as a large presentation screen used for an interactive presentation session.

FIGS. 4A-4D are block diagrams showing interaction with a system including an input device 410A-410D according to an example. The interactions illustrate one-to-one (1:1) movement mapping, as well as non-1:1 mapping, that may be used. Such variations in mapping strategies may enable systems to take advantage of differences in size between input devices 410A-410D and displays 430A-430D, and provide different mapping levels of accuracy, precision, and/or speed or other factors. An example input device 410A-410D may have a size including a 9" diagonal, in contrast to an example display 430A-430D having a size including a 23" diagonal. Motion and positioning of the sensed hand 440A-440D relative to the smaller input device 410A-410D may be mapped to motion and positioning of the virtual hand 450B-450D relative to the larger display 430A-430D based on a combination of absolute and/or relative techniques to provide interaction and fluidity.

Figure 4A:
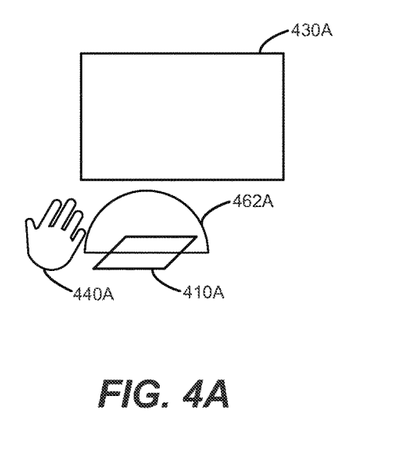
FIGS. 4A-4D are block diagrams showing interaction with a system including an input device according to an example.

FIG. 4A shows an interaction space 462A and display 430A associated with the input device 410A. A sensed hand 440A is shown prior to entering the interaction space 462A, and the display 430A is not displaying a virtual hand.

Although the interaction space 462A is shown generally as a hemisphere extending above the input device 410A, other shapes (e.g., rectangular prism, composite/stitched shapes, or amorphous shapes) may be associated with the interaction space 462A. In alternate examples, a shape of the interaction space 462A may vary over time. For example, the interaction space 462A may shrink during a sensed touch session, and grow during an idle time (e.g., between sessions) and/or during a 3D interaction modality, enabling a large degree of freedom of movement for 3D gesturing and manipulation movement. The display 430A is shown without a virtual hand being displayed, indicating a state prior to any interaction (e.g., before a sense session, during a non-display phase of a sense session, or during a time between sense sessions).

Figure 4B:
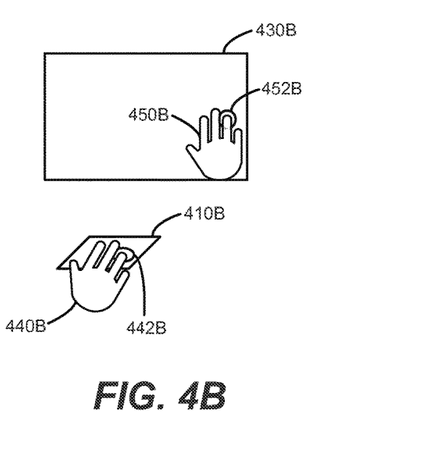

FIG. 4B shows input device 410B sensing sensed hand 440B associated with a sensed touch 442B. Display 430B includes a virtual hand 450B and virtual touch 452B.

A sense session may be initiated by entering an interaction space, entering a certain distance range from the input device 410B, and/or by touching the input device 410B. The input device 410B may detect that the sensed hand 440B has entered the interaction space based on proximity detection (e.g., heat/infrared) and/or other detection indicating that the sensed hand 440B is within a field of view or interaction space associated with the input device 410B. The sense session may be associated with displaying the virtual hand 450B on the display 430B. The input device 410B can provide combined data based on sensor fusion, enabling the virtual hand 450B to reflect a position, orientation, and other features of the sensed hand 440B. As illustrated, the virtual hand 450B reflects extended fingers parallel to sides of the display 430B, similar to how the sensed hand 440B includes extended fingers parallel to sides of the input device 410B. Additionally, the input device 410B has determined that the sensed touch 442B corresponds to a ring finger, displaying the virtual hand 450B and virtual touch 452B accordingly.

A location of the sensed hand 440B to initiate the sense session may be based on a location of sensed touch 442B on the input device 410B. The position of the sensed hand 440B (e.g., a position relative to the input device 410B), may correspond to a relative location of the virtual hand 450B and virtual touch 452B initiated on the display 430B. Thus, a relative and/or scaled location may be chosen for initial display of the virtual hand 450B, although other techniques may be used. For example, a non-relative mapping may be used, such as displaying the virtual hand 450B initially at the center of the display 430B. The sense session shown in FIG. 4B shows the position of the sensed hand 440B and sensed touch 442B as being off-center of the input device 410B, such that the virtual hand 450B and virtual touch 452B are similarly displayed off-center. A sense session thereby may be initiated by positioning the sensed hand 440B and/or by touching the sensed touch 442B at a position on the input device 410B corresponding to a desired position on the display 430B. In an example, a displayed element, such as a button or other user interface element, may be toward the right side of the display 430B. Accordingly, a sense session may be initiated with relative positioning, such that the virtual hand 450B is situated at or near the displayed element, thereby minimizing or eliminating a need for additional movements/gestures to cause the virtual hand 450B and/or virtual touch 452B to get within range of the target displayed element.

Example input devices 410B also may identify cosmetic features of a sensed hand, enabling the input device 410B to scale and adjust the virtual hand 450B to match the sensed hand's actual hand size and skin tone, or other features that enhance a sense of immersion in the direct touch experience. In an example, a controller may identify the size of the display 430B and the size of the input device 410B, in order to provide proper visual scaling of the virtual hand 450B as desired.

Figure 4C:
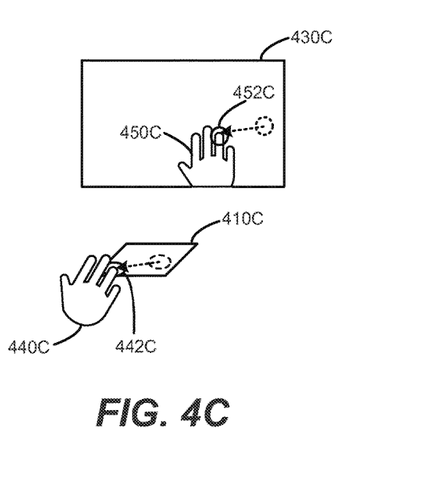

FIG. 4C shows sensed hand 440C and sensed touch 442C associated with input device 410C, after sensed movement of the sensed hand 440C and sensed touch 442C. The movement and/or orientation of the sensed hand 440C may be detected based on combined data, including touch data and/or contactless data. The display 430C displays virtual hand 450C and virtual touch 452C tracking the movement and/or orientation of the sensed hand 440C and sensed touch 442C. Such movement tracking may be associated with a 2D interaction modality/session.

The movement is shown mapping at a 1:1 ratio between the sensed hand 440C and virtual hand 450C. 1:1 mapping is possible, even when the input device 410C is a different size than the display 430C. Thus, even though the sensed touch 442C moved nearly across the entire input device 410C from one side to another, the virtual touch 452C moved from an edge of the display 430C to a location just inside the edge of the display 430C. In an example, both the sensed movement and the virtual movement is approximately equal in actual distance. The sensed hand 440C also has moved such that nearly the entire sensed hand 440C (except for a portion of the sensed fingers) is no longer above the input device 410C. However, the virtual hand 450C is shown substantially on the display 430C (except for small portion of a palm). Thus, the virtual hand 450C is capable of being generated and displayed independent of what amount of the sensed hand 440C is within a field of view and/or interaction space of the input device 410C.

Other mapping techniques may be used for movement, including non-1:1 mappings/ratios (greater than or less than 1:1). For example, a rate of movement of the virtual hand 450C may vary based on factors such as acceleration and/or pressure associated with the sensed hand 440C and/or sensed touch 442C. In an example, the virtual hand 450C may provide increased precision of movement based on scaling at less than a 1:1 ratio. Such change in mapping/scaling may be triggered by a gesture, and/or may be constantly monitored and adjusted (e.g., based on acceleration or pressure as they are being sensed). Thus, example systems may provide enhanced interaction at greater speed, accuracy, precision, or other factors compared to the raw data provided by the sensed hand 440C. In an example, the movement mapping between the virtual hand 450C and sensed hand 440C may increase based on an increase of pressure associated with the sensed touch 442C.

Figure 4D:
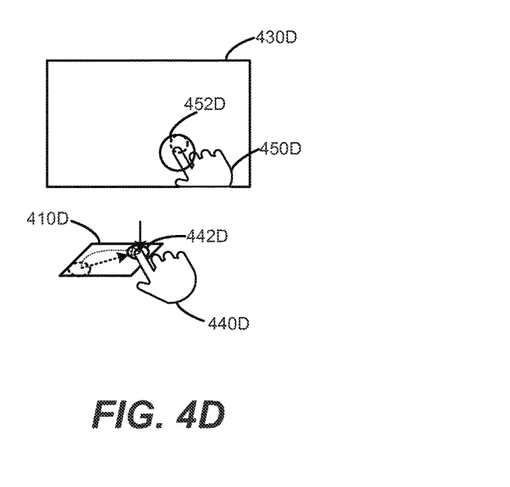

FIG. 4D shows input device 410D associated with sensed hand 440D and sensed touch 442D after a reposition gesture. The reposition gesture may be included as a separate sense session, and may be provided as a phase in an existing sense session (e.g., may be provided without interrupting a current sense session). The sensed hand 440D has changed position and orientation, including changed orientation of the fingers and knuckles of the sensed hand 440D. As indicated by the hollow dashed arrow, the sensed hand 440D has been lifted away from the input device 410D, and repositioned for sensed touch 442D. The display 430D includes virtual hand 450D and virtual touch 452D. Virtual touch 452D includes an increased area, based on an increased downward pressure associated with the sensed touch 442D. The increased area may be used for various interactions, such as painting with a broader brush stroke, selecting multiple documents, moving along a z-axis in 3D space, and so on. Thus, input device 430D may include a force pad to sense pressure or other indication of how hard a sensed hand 440D is pushing on the input device 430D to generate sensed touch 442D. Pressure (and other input) can be represented by growing or shrinking the virtual touch 452D or other indications (e.g., changing the virtual hand 450D (e.g., color), cursor, or other indication).

During repositioning (e.g., when the sensed hand 440D is lifted away from the input device 410D), a position of the virtual hand 450D may be maintained. For example, a static image of the virtual hand 450D may be displayed. Maintaining the position of the virtual hand 450D may allow the sensed hand 440D to achieve additional freedom of movement with respect to a smaller-sized input device 410D, e.g., when the sensed hand 440D reaches an edge of the input device 410D. In the example of FIG. 4D, the repositioning enables the sensed hand 440D to be in a position to be moved further to the left, enabling the virtual hand 450D to move to the left yet again. Thus, movement of the virtual hand 450D across the display 430D may be achieved in increments, based on movement scaling at a variety of ratios, including 1:1 movement scaling.

Independent of the movement of the virtual hand 450D, the orientation and other aspects of the sensed hand 440D may be tracked. For example, the sensed hand 440D folded three of its fingers and rotated slightly counter clockwise. The input device 410D can track such orientation features and cause the virtual hand 450D to mirror them. The mirroring may continue, even when maintaining the position of the virtual hand 450D (e.g., during repositioning). Alternatively, the virtual hand 450D may be removed from the display 430D during repositioning (e.g., the various gyrations, orientations, and/or positioning of the sensed hand 440D may be disregarded during the repositioning). The virtual hand 450D may be caused to re-appear on the display 430D with updated orientation/position following the repositioning. Accordingly, a sense of immersion may be maintained, even when interrupting the 1:1 tracking of movement (and/or movement based on non-1:1 tracking) between the sensed hand 440D and virtual hand 450D. Further, use of various gestures enables transitioning between input modalities, such that one form of input (e.g., gyrating the hand above the input device 410D) may provide different interactions depending on the gesture and corresponding modality that has been transitioned to.

Thus, the scenarios described above provide an example movement of the virtual hand based on an actual-to-virtual hand association model. Example systems may include relative and/or absolute interaction use models alternatively and/or in combination. In such a use model, a sense session is initiated (e.g., triggered by proximity, touch, and/or field of view) and the virtual hand appears over the display at a scaled "absolute" location corresponding to the sensed hand relative to the input device. The virtual hand may appear in a similar anatomical manner to the sensed hand, based on virtual computer reconstruction/generation using combined data. Motion of the sensed hand relative to the input device may revert to a one-to-one mapping between input device space and display space. Lifting and repositioning the sensed hand may be sensed by a touch and/or contactless sensor, recognized by a controller and/or software, and the virtual hand can maintain its displayed position. After repositioning, the virtual hand can maintain its previous "absolute" position on the display, and adjust to any anatomical changes in the orientation of the hand/fingers/etc. Absolute one-to-one mapping between the sensed hand (relative to the input device) and the virtual hand (relative to the display) may continue. Other use models are possible, including use models that do not involve repositioning. Examples are capable of capturing the direct, precise 1:1 correlation of movement, while enabling a virtual hand to move all over a display, even if the display is substantially larger than the input device. In other use models/examples, other mappings besides 1:1 may be used.

Gestures like finger pinch-and-spread for zoom, two-finger-flick for frame transposition, and others may be supported and rendered visibly on the display by the translucent virtual hand in real-time. Other gestures also may be supported, including gestures involving touch on the input device, and gestures in the interaction space without contact with the input device.

Transition of a session and/or phase of a session may trigger (e.g., be initiated, transitioned, ended, and so on) based on removal of the sensed hand from the interaction space. Such transition may, e.g., reset a sense session to a new state. For example, a system may switch from absolute 1:1 mapping to a scaled relative non-1:1 mapping. Virtual hand placement may be driven to a scaled representation of the full size of the display, or other change for initial virtual hand placement.

Figure 5:
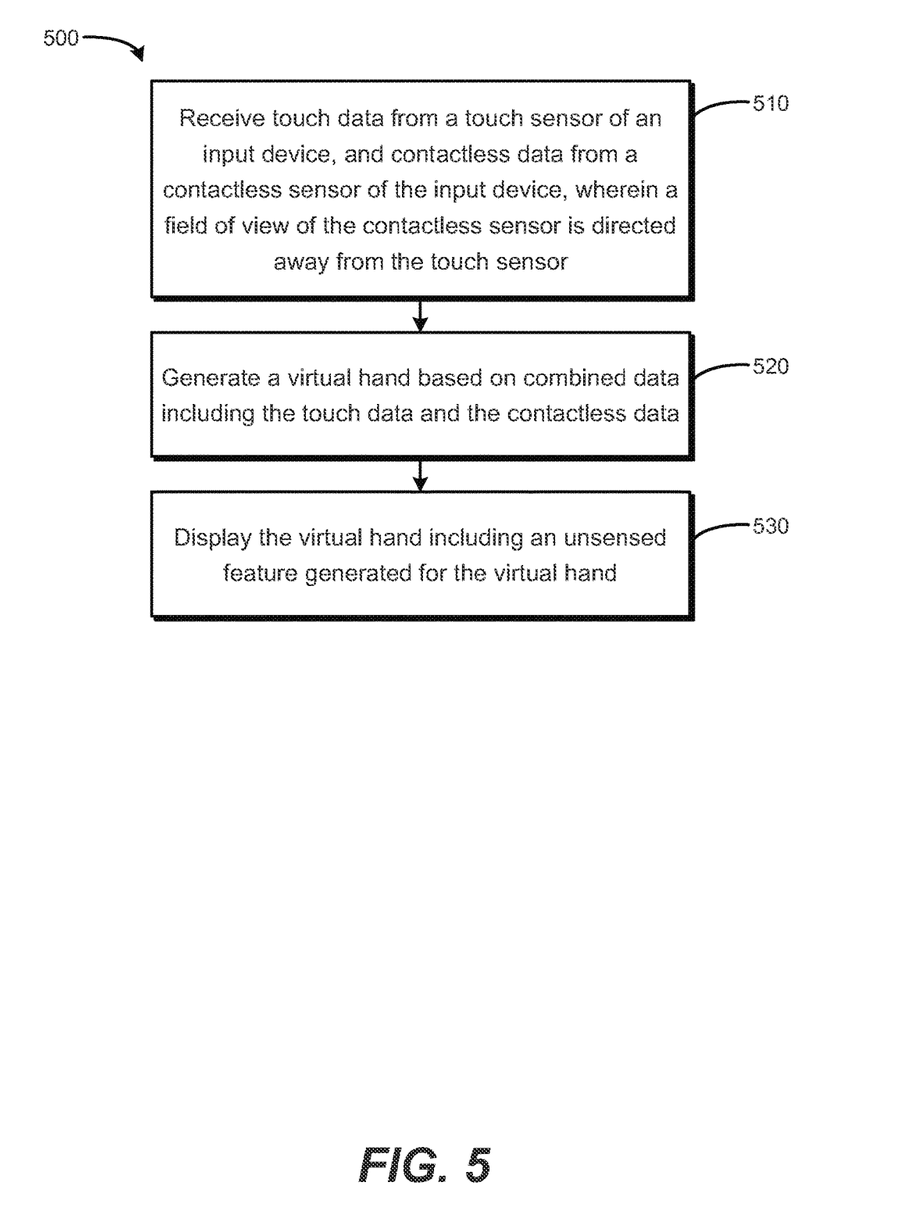
FIG. 5 is a flow chart based on generating a virtual hand based on an input device according to an example.

FIG. 5 is a flow chart 500 based on generating a virtual hand based on an input device according to an example. In block 510, touch data is received from a touch sensor of an input device, and contactless data is received from a contactless sensor of the input device. For example, a capacitive array may be used as a touch sensor, and a 3D sensor may be used as the contactless sensor. A field of view of the contactless sensor is directed away from the touch sensor. For example, the 3D sensor may point sideways/upward substantially away from a touch sensor, to image a bottom and/or side of a sensed hand that is to interact with the input device. In block 520, a virtual hand is generated based on combined data including the touch data and the contactless data. For example, the virtual hand may be generated using the combined data to identify finger positions and using the touch data to refine information from the contactless sensor to generate the virtual hand that mimics the sensed hand. In block 530, the virtual hand is displayed including an unsensed feature generated for the virtual hand. For example, the unsensed feature may be constructed by interpolating the combined data. In an example, the unsensed feature may be a back-side of the virtual hand, generated from combined data indicating a front-side (palm-side) of the sensed hand. In alternate examples, the unsensed feature may include areas between fingers, knuckle orientation, and other features (which may be derived based on general anatomical models of hands).

Figure 6:
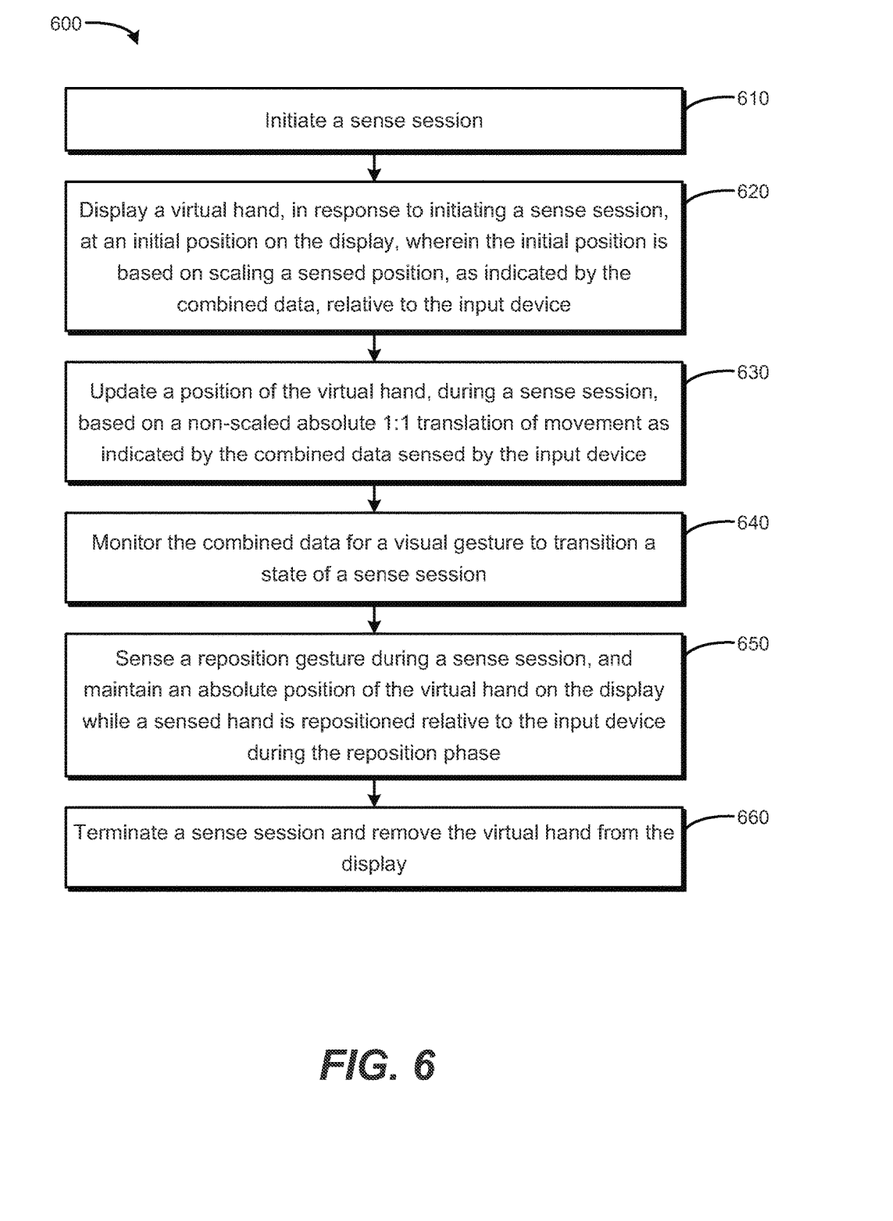
FIG. 6 is a flow chart based on displaying a virtual hand associated with a sense session according to an example.

FIG. 6 is a flow chart 600 based on displaying a virtual hand associated with a sense session according to an example. In block 610, a sense session is initiated. For example, the sense session may be initiated based on sensing a hand in an interaction space and/or a field of view of a contactless sensor, or detecting a sensed touch. In alternate examples, other sessions similarly may be initiated, such as a gesture session, a reposition session, a 3D interaction recognition session, and other sessions. The sense session initiated in block 610 may include at least one state, including a display state, a relative positioning state, a motion state, a repositioning state, and so on. The sense session may transition between different states based on combined data. In block 620, a virtual hand is displayed, in response to initiating a sense session, at an initial position on the display. The initial position is based on scaling a sensed position, as indicated by the combined data, relative to the input device. For example, a sensed hand may be detected at a center of the input device, and the virtual hand initially may be displayed at a center of the display. In an alternate example, the sensed hand may be detected at an upper left corner of the input device, and the virtual hand initially may be displayed at an upper left corner of the display. In block 630, a position of the virtual hand is updated, during a sense session, based on a non-scaled absolute 1:1 translation of movement as indicated by the combined data sensed by the input device. For example, the combined data may indicate sensed movement of a sensed hand, relative to the input device, of one inch. Accordingly, the virtual hand may be displayed as moving one inch on the display, matching the sensed movement. Such 1:1 mapping of movement between the sensed hand and the virtual hand is possible even when the touch sensor of the input device is much smaller than the display surface of the display (e.g., a ratio of sizes between the touch sensor and the display is not 1:1). In alternate examples, the virtual hand may be moved/updated in a ratio other than 1:1 relative to the sensed hand, e.g., for enhanced precision (a ratio lower than 1:1) and/or enhanced speed (a ratio higher than 1:1). The mapping may also change over time, e.g., based on movement acceleration and/or pressure. In block 640, the combined data is monitored for a visual gesture to transition a state of a sense session. For example, the combined data may indicate that the sense session is transitioning from a movement state, to a stationary state, to a reposition state, and then to a termination state (and/or other states). In block 650, a reposition gesture is sensed during a sense session. For example, the combined data may indicate that a sensed hand is lifted away from the input device (e.g., the touch sensor indicates no contact, and/or the contactless sensor indicates a sensed hand has moved outside of a field of view and/or interaction space of the input device). During the reposition phase, an absolute position of the virtual hand is maintained on the display while a sensed hand is repositioned relative to the input device. For example, the displayed virtual hand is maintained in its position. The virtual hand also may be updated to track the sensed hand's orientation and/or hand/finger positioning during the reposition gesture. In block 660, a sense session is terminated and the virtual hand is removed from the display. For example, the combined data may indicate that a sensed hand has remained motionless for a duration and/or has been removed from a field of view and/or interaction space of the input device. In an example, the virtual hand is removed by gradually fading the virtual hand away by increasing its transparency.

What is claimed is:

1. A computing system comprising:
a display;
an input device including at least one touch sensor to provide touch data, and at least one contactless sensor to provide contactless data, wherein a field of view of the at least one contactless sensor is directed away from the at least one touch sensor; and
a controller to combine the touch data and the contactless data into combined data to generate, based on the combined data, a virtual hand to be displayed on the display including an unsensed feature generated for the virtual hand,
wherein the controller is to generate the unsensed feature of the virtual hand to be displayed on the display from an overhead view relative to the display, wherein the unsensed feature is generated based on the combined data sensed from a non-overhead view relative to the at least one touch sensor, and
wherein the controller is to sense a reposition gesture during a sense session, and initiate a reposition phase of the sense session associated with maintaining an absolute position of the virtual hand on the display, based on the combined data indicating a sensed hand being repositioned relative to the input device during the reposition phase.

2. The computing system of claim 1, wherein the controller is to obtain 3D information for the virtual hand from the at least one contactless sensor.

3. The computing system of claim 1, wherein the at least one touch sensor includes a touch responsive surface smaller than the display, and the controller is to provide 1:1 absolute mapping between displayed movement of the virtual hand and sensed movement as sensed by the input device.

4. The computing system of claim 1, wherein the at least one contactless sensor is active, including at least one sensor emitter and at least one sensor receiver.

5. The computer system of claim 1, the controller to weight differently the data from the at least one contactless sensor and the at least one touch sensor when generating the virtual hand to be displayed.

6. The computer system of claim 1, wherein the touch sensor has a larger surface area than the display.

7. The computer system of claim 1, the controller to transition between different modalities based on input to the touch sensor.

8. The computer system of claim 1, wherein the at least one contactless is disposed at, and looks outward from, a surface of the at least one touch sensor.

9. The computing system of claim 1, wherein the unsensed feature is a back-side feature of the virtual hand.

10. A method comprising:
receiving touch data from at least one touch sensor of an input device, and contactless data from at least one contactless sensor of the input device, wherein a field of view of the at least one contactless sensor is directed away from the at least one touch sensor;
generating a virtual hand based on combined data including the touch data and the contactless data;
displaying the virtual hand including an unsensed feature generated for the virtual hand, the unsensed feature being unsensed by both the touch sensor and the contactless sensor; and
sensing a reposition gesture during a sense session, and initiating a reposition phase of the sense session associated with maintaining an absolute position of the virtual hand on the display, based on the combined data indicating a sensed hand being repositioned relative to the input device during the reposition phase.

11. The method of claim 10, further comprising displaying the virtual hand, in response to initiating a sense session, at an initial position on the display, wherein the initial position is based on scaling a sensed position, as indicated by the combined data, relative to the input device.

12. The method of claim 10, further comprising updating a position of the virtual hand, during a sense session, based on a non-scaled absolute 1:1 translation of movement as indicated by the combined data sensed by the input device.

13. The method of claim 10, further comprising terminating a session and removing the virtual hand from the display, based on at least one of i) a duration of non-change in the combined data, and ii) the combined data indicating removal of a sensed hand from an interaction space of the input device.

14. The method of claim 10, further comprising monitoring the combined data for a visual gesture to transition a state of a session, including at least one of: i) an object entering an interaction space of the input device, ii) an object leaving the interaction space, and iii) an object remaining substantially motionless within the interaction space for a duration of time.

15. The method of claim 10, further comprising adjusting the size and color of the virtual hand to match corresponding combined data as sensed by the input device.

16. The method of claim 10, further comprising deriving orientation and position of virtual fingers for the virtual hand based on the combined data.

17. A non-transitory machine-readable storage medium encoded with instructions executable by a computing device that, when executed, cause the computing device to:
- receive touch data from at least one touch sensor of an input device, and contactless data from at least one contactless sensor of the input device, wherein a field of view of the at least one contactless sensor is directed away from the at least one touch sensor;
- generate a virtual hand based on combined data including the touch data and the contactless data including weighting differently the data from the at least one contactless sensor and the at least one touch sensor when generating the virtual hand to be displayed; and
- display the virtual hand including an unsensed feature generated for the virtual hand, the unsensed feature being unsensed by both the touch sensor and the contactless sensor.

18. The storage medium of claim 17, further comprising instructions that cause the computing device to display the virtual hand translucently overlaid on underlying displayed elements.

19. A computing system comprising:
- a display;
- an input device including at least one touch sensor to provide touch data, and at least one contactless sensor to provide contactless data, wherein a field of view of the at least one contactless sensor is directed away from the at least one touch sensor; and
- a controller to combine the touch data and the contactless data into combined data to generate, based on the combined data, a virtual hand to be displayed on the display, the controller is to weight differently the touch data and the contactless data when generating the virtual hand,
- wherein the at least one contactless sensor is disposed at and completely surrounded by the at least one touch sensor.

20. A computing system comprising:
- a display;
- an input device including at least one touch sensor to provide touch data, and at least one contactless sensor to provide contactless data, wherein a field of view of the at least one contactless sensor is directed away from the at least one touch sensor;
- a controller to combine the touch data and the contactless data into combined data to generate, based on the combined data, a virtual hand to be displayed on the display; and
- an emitter to emit structured illumination, having a non-uniform pattern, toward the at least one touch sensor, the contactless sensor to use the structured illumination to sense in the field of view.

* * * * *